Patented Dec. 18, 1951

2,578,665

UNITED STATES PATENT OFFICE 2,578,665

COATED PLASTIC PRODUCTS

Johan Bjorksten and Stuart O. Fiedler, Chicago, Ill., and Luther L. Yaeger, Hammond, Ind., assignors to Nash-Kelvinator Corporation, Kenosha, Wis., a corporation of Maryland No Drawing. Application February 21, 1947, Serial No. 730,192

12 Claims. (Cl. 260—17)

This invention relates to articles made of polystyrene and more specifically to such articles, covered with a surface coating which imparts to them a greatly enhanced resistance to abrasives, solvents and to other destructive influences; and also to modes of preparing and applying such surface coating materials for polystyrene.

Polystyrene is a widely employed construction material. For example, it is being used in refrigeration equipment and also in automotive and aircraft industries for structural as well as decorative purposes. However, the utility of polystyrene is greatly restricted by certain undesirable properties, namely: 1. Very high electrostatic charges which cause excessive attraction for dust. 2. High susceptibility to scratching. (This does not bear a direct relation to the hardness of the article, inasmuch as the optical effects of scratching are more pronounced with polystyrene than with certain other materials which actually have a lower hardness, such as, for example, acrylates.) 3. Clouding or dissolving of the styrene surface by commonly used cleaning fluids.

Any one of the reasons is sufficient to greatly reduce the applicability of polystyrene as a material for many articles where it would otherwise be desirable by virtue of its excellent physical and mechanical properties and its relatively low price.

In the past, it has been attempted to apply to polystyrene various kinds of coating for added surface protection and to improve its properties. These attempts have all been unsuccessful. Coatings of shellac, while soluble in solvents which do not attack the polystyrene, are not sufficiently tenacious to give the protection desired. Furthermore, they are soluble in alcoholic cleaning fluids. Ethyl cellulose coatings of the polystyrenes and of their derivatives have also been tried, and while these possess a considerable resistance to many solvents and to electrostatic influences, they are not very scratch resisting, and, above all, they fail to bond to the polystyrene. It can be said generally that those coatings of prior art which bond to the polystyrene so as not to become detached therefrom are soluble only in solvents which are also solvents for polystyrene, and which therefore etch and cloud it, and that coatings of prior art reasonably suitable in other regards fail to adhere to polystyrene.

Attempts made in the past to coat polystyrene with acrylate or methacrylate type polymers failed, because the solvents necessary to dissolve these etched the styrene so as to destroy its transparency.

The present invention has for an object to overcome the disadvantages just mentioned. Another object is to provide a novel coating for polystyrenes which forms an integral bond therewith, and which imparts to polystyrene enhanced resistance to scratching, reduced electrostatic sensitivity, and greatly enhanced resistance to cleaning fluids. A further object is a polystyrene article protected by such coating. A still further object is a process of applying to the polystyrene articles a protective coating integrally bonded thereto. Further objects will become apparent as the following detailed description proceeds.

By "integral bond" we mean that the coating applied to all practical purposes forms a unity with the material beneath it, so that it cannot be peeled off or loosened as a layer, for example, by scratching with a sharp instrument.

We have not succeeded in providing acrylate coatings which adhere firmly to polystyrene, without disturbing its clarity or appearance. Our products and procedures are based on the discoveries:

(a) that if the active solvent in which acrylate resins are prepared, and furnished commercially is distilled off to a large degree, it is then possible to formulate suitable coating compositions for depositing acrylate coatings on polystyrene without etching the polystyrene surface:

(b) that the etching effect of active solvents can be largely checked by the inclusion of cellulose esters:

(c) that by careful balancing of solvent compositions, it is possible to provide a combination solvent which dissolves and deposits acrylates, yet is non-etching to syrene:

(d) that cellulose esters, which otherwise do not adhere to polystyrene, can be brought to adhere firmly by the addition of even a minor percentage of acrylates, such as from 1% to 40%.

In accordance with this invention, we employ as the principal protective ingredient, an acrylate or a methacrylate polymer.

For the sake of brevity, we shall hereafter include the film-forming acrylate and methacrylate-type resins under the single generic term "acrylate."

Acrylates are available as solid compounds, usable directly for injection molding, and also in a liquid form. The latter are usually obtained by the polymerization of acrylate monomers in the presence of a solvent therefor, which is not removed.

However, to obtain the desired surface characteristics of the coating, without damaging the polystyrene surface to which this was applied, it was necessary to carefully adapt the solvent balance of the composition, so as to adjust the acrylate material to the said solvents.

Among the numerous types of acrylate employed for the purpose of the invention, the preferred type is:

"Ethyl and methyl methacrylate co-polymer" made by the E. I. du Pont de Nemours & Co.

Somewhat less favorable film characteristics were obtained with the following type of acrylate:

"Ethyl methacrylate polymer" made by the Guth Products Company.

The following types also gave a coating, but were not preferred because of resistance less favorable than the preferred types of acrylates stated above:

"Butyl methacrylate" polymerized to form a solid thermoplastic powder made by the E. I. du Pont de Nemours & Co.

Methyl methacrylate polymer.

One acrylate, which gave the best results, was, however, furnished, by the manufacturer, dissolved in ethyleneglycol monoethylether acetate, in which solvent this resin was prepared. This solvent interfered with the proper application of the coating, by etching polystyrene. This necessitated correction, which could be accomplished:

(a) by removing a large portion of this solvent by distillation;

(b) by carrying out the manufacture of a resin in a different solvent less active on styrene, e. g., ethyleneglycol monomethyl ether;

(c) by compounding with a different film forming body, which has a tendency to repress solvent action on styrene, e. g., a cellulose ester.

This problem, and the three remedies listed, apply to any acrylate resin prepared and furnished in a solution of an active styrene solvent. When an injection molding type acrylate is employed, this problem does not exist; however, the viscosities of such resins are so high as to preclude spraying as the application method, unless an unusually thin coating (less than about .001") is desired. Such solutions can be applied by dipping the object to be coated, or by brushing.

Specific embodiments of the invention are illustrated by the following examples:

Example 1

30% ethyl acrylate was polymerized by refluxing with ½% of benzoyl peroxide in 69½% ethyleneglycolmonomethylether, until a sample on drying formed a film having a mar resistance at least 10% higher than that of polystyrene by the A. S. T. M. Procedure D 673–42T (falling carborundum grit). 20% of the product thus obtained was dissolved in 80% of a solvent consisting of 25% methyl ethyl ketone, 25% ethanol, and 50% diethylene glycol mono ethyl ether.

The resultant product was brushed on to a polystyrene object, and dried in a forced draft cabinet at 63° C. The resultant coating had a substantially enhanced mar and solvent resistance.

Example 2

25% ethyl methacrylate monomer was polymerized by refluxing in the solvent consisting of equal parts of ethyleneglycolmonomethylether, methyl ethyl ketone, and ethanol. A pressure was maintained so as to permit maintenance of a reaction temperature of 180° C. The reaction was continued until a sample removed and allowed to dry to a film, gave a mar resistance at least 10% higher than that of polystyrene by the A. S. T. M. Procedure D 673–42T.

The resultant product was then sprayed on to a polystyrene object and dried at 70° C. It was found to have a substantially enhanced mar and solvent resistance.

Example 3

| | Percent by weight |
|---|---|
| Methyl methacrylate polymer | 10 |
| Acetone | 20 |
| Ethyleneglycolmonomethylether | 30 |
| Denatured ethanol | 11 |
| Ethyl lactate | 9 |
| Methyl acetate | 14 |
| Naptha thinner | 6 |
| | 100 |

The acrylate powder was dissolved in the acetone and esters. When uniform, the remaining solvents were blended into the mixture with agitation. A polystyrene panel was dipped into the lacquer and dried at 55° C. A clear, tenacious coating was deposited on the plastic. This coating had a mar resistance substantially higher than polystyrene and was firmly bonded thereto.

The present invention provides an article of manufacture comprising a polystyrene surface having integrally bonded thereto an acrylate coating. In a more specific aspect it provides the combination of a polystyrene surface having integrally bonded thereto a coating comprising an acrylate and a cellulose ester. A coating comprising 100 to 1% of an acrylate and from 0 to 99% of a cellulose ester may be used. Suitable cellulose esters are cellulose aceto butyrate and cellulose aceto propionate.

In the formulas given, the percentage of solids is not critical, as a variation in this factor will only affect the thickness of the resultant coating, and not its qualities.

We may employ any other cellulose ester which is capable of forming a hard tenacious film, for example, cellulose acetate, cellulose acetate propionate, cellulose propionate, and the like. Therein a similar connection of cellulose acetate hydrogen phthalate is disclosed and claimed in our co-pending application Serial No. 730,193 filed February 21, 1947.

With reference to the solvent combinations stated, instead of methyl ethyl ketone, we may employ any other ketone, ester, toluene or nitro aliphatic substance excepting nitro methane, which has a boiling range below about 120° C., or combinations thereof. Instead of ethyl alcohol, we can use nitro methane, or any other aliphatic alcohol, or lactate, having less than 6 carbon atoms. We can also use "Butyl Cellosolve" and any other glycol ether having a comparable or higher degree of volatility, diacetone alcohol, and the like.

It is possible to work into the formulations even other solvents, plasticizers, pigments, dyestuffs, perfumes and the like as well as other resins and to co-polymerize these or their components with the acrylates disclosed. The term "acrylate" we understand to include such products, having the essential characteristics herein described in relation to polystyrenes. When thus modifying the compositions, the balance between polystyrene solvents and polystyrene nonsolvents must be maintained. This is done in the following manner: If the coating composition is turbid, the percentage of ketone type solvent or of glycol ether ester should be increased, and likewise if the bond of the coating to the polystyrene is poor. If, on the other hand, the polystyrene surface is etched by the coating composition, then the percentage of these solvents just mentioned should be reduced, in favor of nitro methane, lower aliphatic alcohols, lactates and ethyleneglycolmonomethyl ester, or hydrocarbon nonsolvents such as aliphatic petroleum fractions e. g., kerosene, or of combinations of these, or other solvents having similar solvent and volatility characteristics.

Suggested ranges of percentage for these groups of solvents are as follows:

Aliphatic ketones and esters, toluene and nitro-aliphatic substances other than nitromethane having a boiling range below 120° C., preferred 3 to 25%; usable 1 to 35%.

Nitromethane, aliphatic alcohols and lactates having less than 6 carbon atoms, preferred 5 to 35%; usable 2 to 45%.

Diacetone alcohol, glycol ethers and esters, preferred 20 to 40%; usable 14 to 50%.

These percentages are given merely as guides. Because of the great flexibility of this type of solvent formulation, it is not possible to state absolute ranges. In giving the rules, procedures and examples on the preceding pages, we have provided information fully adequate to enable the skilled chemist to establish the proper balance for the purposes of this invention, for any particular solvents he may desire to employ.

While reference has been made throughout this application to polystyrene, it is fully understood that this term includes such co-polymers or modified products as are commercially known under the generic term, styrene type resins. This includes copolymers between styrenes and acrylates, polymers with acrylonitrile and like materials known as being suitably co-polymerizable with styrene. The di-vinyl benzenes and their polymers and co-polymers are also included in the generic terms polystyrenes.

It is thus seen that this invention is broad in scope. The specific ranges and examples have been given to illustrate only, and not to restrict the invention in any manner. The invention is to be limited only by the claims in which we intend to cover all novelty inherent in the invention as broadly as possible, in view of prior art.

Having thus disclosed our invention, we claim:

1. An article of manufacture comprising a polystyrene surface, having integrally bonded thereto a coating comprising a substance selected from the group consisting of polyethyl acrylate, polyethyl methacrylate, and polymethyl methacrylate, said coating being deposited from a composition containing from 1 to 35% of a solvent selected from the group consisting of aliphatic ketones and esters, toluene and nitro aliphatic substances other than nitro methane, having a boiling range below 120° C.; from 2 to 45% of a solvent selected from the group consisting of nitromethane, aliphatic alcohols and lactates having one to five carbon atoms; and from 14 to 50% of a solvent selected from the group consisting of diacetone alcohol, glycol ethers and esters.

2. A coating composition, comprising a substance selected from the group consisting of polyethyl acrylate, polyethyl methacrylate and polymethyl methacrylate, dissolved in a solvent composition comprising from 3 to 25% of a solvent selected from the group consisting of aliphatic ketones and esters, toluene, and nitro-aliphatic substances other than nitromethane having a boiling range below 120° C.; 5 to 35% of a solvent selected from the class consisting of nitromethane, aliphatic alcohols, and lactates having 1 to 5 carbon atoms; and 20 to 40% of a substance selected from the group consisting of diacetone alcohol, glycol ethers and esters.

3. A coating composition comprising a substance selected from the group consisting of polyethyl acrylate, polyethyl methacrylate and polymethyl methacrylate and a cellulose ester, dissolved in a solvent composition comprising from 3 to 25% of a solvent selected from the group consisting of aliphatic ketones and esters, toluene, and nitro-aliphatic substances other than nitromethane having a boiling range below 120° C.; 5 to 35% of a solvent selected from the class consisting of nitromethane aliphatic alcohols, and lactates having 1 to 5 carbon atoms; and 20 to 40% of a substance selected from the group consisting of diacetone alcohol, glycol ethers and esters.

4. As claim 3, the cellulose ester being cellulose aceto butyrate.

5. As claim 3, the cellulose ester being cellulose aceto propionate.

6. A coating composition comprising a substance selected from the group consisting of polyethyl acrylate, polyethyl methacrylate and polymethyl methacrylate, and a film forming cellulose ester, dissolved in a solvent comprising from 1 to 35% of a solvent selected from the group consisting of aliphatic ketones and esters, toluene and nitro aliphatic substances other than nitro methane, having a boiling range below 120° C.; from 2 to 45% of a solvent selected from the group consisting of nitromethane, aliphatic alcohols and lactates having 1 to 5 carbon atoms; and from 14 to 50% of a solvent selected from the group consisting of diacetone alcohol, glycol ethers and esters.

7. The article of claim 1, further characterized by said coating additionally comprising a cellulose ester.

8. The article of claim 1, further characterized by said coating additionally comprising cellulose acetobutyrate.

9. The article of claim 1, further characterized by said coating additionally comprising cellulose acetopropionate.

10. In a process for enhancing the surface properties of polystyrene by utilizing the high specific adhesivity therefor of certain synthetic resins, which depends on applying to a polystyrene surface synthetic resinous material having superior surface properties, dissolved in a solvent which does not dissolve or attack polystyrene, the step of applying to a polystyrene surface the composition of claim 2.

11. In a process for enhancing the surface properties of polystyrene by utilizing the high specific adhesivity therefor of certain synthetic resins, which depends on applying to a polystyrene surface synthetic resinous material having superior surface properties, dissolved in a solvent which does not dissolve or attack polystyrene, the step of applying to a polystyrene surface the composition of claim 3.

12. In a process for enhancing the surface properties of polystyrene by utilizing the high specific adhesivity therefor of certain synthetic resins, which depends on applying to a polystyrene surface synthetic resinous material having superior surface properties, dissolved in a solvent which does not dissolve or attack polystyrene, the step of applying to a polystyrene surface the composition of claim 6.

JOHAN BJORKSTEN.
STUART O. FIEDLER.
LUTHER L. YAEGER.

REFERENCES CITED

The following references are of record in the file of this patent:

UNITED STATES PATENTS

| Number | Name | Date |
|---|---|---|
| 2,071,419 | Moss | Feb. 23, 1937 |
| 2,084,415 | Strain | June 22, 1937 |
| 2,238,694 | Graves | Apr. 15, 1941 |
| 2,254,904 | Moss | Sept. 2, 1941 |
| 2,292,393 | Mitchell | Aug. 11, 1942 |
| 2,332,461 | Muskat et al. | Oct. 19, 1943 |